United States Patent
Hsu et al.

(10) Patent No.: US 12,369,148 B2
(45) Date of Patent: Jul. 22, 2025

(54) SORTING METHOD OF COMMUNICATION DATA AND COMMUNICATION APPARATUS THEREOF

(71) Applicant: Aespula Technology INC., Zhubei (TW)

(72) Inventors: Terng-Yin Hsu, Zhubei (TW); Hong-Ming Huang, Zhubei (TW)

(73) Assignee: Aespula Technology INC., Zhubei (TW)

( * ) Notice: Subject to any disclaimer, the term of this patent is extended or adjusted under 35 U.S.C. 154(b) by 471 days.

(21) Appl. No.: 18/085,813

(22) Filed: Dec. 21, 2022

(65) Prior Publication Data

US 2024/0215012 A1    Jun. 27, 2024

(51) Int. Cl.
*H04W 72/1263* (2023.01)
*H04W 72/56* (2023.01)
*H04W 84/04* (2009.01)

(52) U.S. Cl.
CPC ....... *H04W 72/1263* (2013.01); *H04W 72/56* (2023.01); *H04W 84/042* (2013.01)

(58) Field of Classification Search
CPC  H04W 72/1263; H04W 72/56; H04W 84/042
See application file for complete search history.

(56) References Cited

U.S. PATENT DOCUMENTS

| | | | |
|---|---|---|---|
| 2009/0028095 A1* | 1/2009 | Kish | H04W 80/04 370/328 |
| 2015/0036592 A1 | 2/2015 | Yoshida | |

FOREIGN PATENT DOCUMENTS

| | | |
|---|---|---|
| CN | 103366013 A | 10/2013 |
| CN | 104137081 A | 11/2014 |
| CN | 105868218 A | 8/2016 |
| CN | 106201665 A | 12/2016 |

\* cited by examiner

*Primary Examiner* — Won Tae C Kim
(74) *Attorney, Agent, or Firm* — Best & Flanagan LLP

(57) ABSTRACT

A sorting method of communication data is executed by a communication apparatus including a processor. The processor sorts communication data packages according to sorting indexes by a first sorting procedure to establish a first sorting list, and determines at least one priority data package and general data packages. The processor sorts the general data packages according to the sorting indexes by a second sorting procedure to establish a second sorting list, and decodes the priority data package. After the priority data package is decoded, the processor determines whether a remaining time period of a time slot is less than an invalid time period of the time slot. If not, the processor executes a worst case. Since the processor decodes the communication data packages that have been sorted, the remaining time period of the time slot can be effectively utilized to improve an efficiency of the communication apparatus.

20 Claims, 5 Drawing Sheets

SORTING METHOD OF COMMUNICATION DATA AND COMMUNICATION APPARATUS THEREOF

BACKGROUND OF THE INVENTION

1. Field of the Invention

The present invention relates to a sorting method and a communication apparatus thereof, especially a sorting method of communication data, and a communication apparatus thereof.

2. Description of the Related Art

A communication apparatus is a cell site being a cellular-enabled mobile device site. The communication apparatus is used to receive communication data packages from mobile devices or transmit the communication data packages to the mobile devices.

Further, the communication apparatus needs to decode the communication data packages when the communication apparatus receives the communication data packages from the mobile devices, and the communication apparatus decodes the communication data packages according to a sequence of receiving the communication data packages during a time slot.

Since data volumes of each of the communication data packages may be different, decoding time periods of decoding each of the communication data packages may also be different.

However, if a remaining time period of the time slot cannot decode a full communication data package, the communication apparatus does not decode the communication data package, and the communication apparatus pushes the communication data package to the next time slot for decoding.

Namely, the communication apparatus may be idle during the remaining time period of the time slot. On the other hand, an efficiency of the communication apparatus may be affected.

Therefore, the communication apparatus for decoding the communication data packages according to the sequence of receiving the communication data packages needs to be improved.

SUMMARY OF THE INVENTION

In view of the above-mentioned needs, the main purpose of the present invention is to provide a sorting method of communication data, and a communication apparatus thereof. The communication apparatus for sorting the communication data includes a memory and a processor. The processor is electrically connected to the memory.

The memory stores a plurality of communication data packages.

The processor executes the sorting method to receive the communication data packages, determine a sorting index of each of the communication data packages, sort the communication data packages according to the sorting indexes by a first sorting procedure to establish a first sorting list, and determine at least one priority data package.

The processor further executes the sorting method to sort the general data packages according to the sorting indexes by a second sorting procedure to establish a second sorting list, decode the at least one priority data package according to the first sorting list, and determine whether a remaining time period of the time slot is less than an invalid time period of the time slot. The remaining time period is a time period of the time slot before the time slot times out. The invalid time period is an entire time period of the time slot without a valid time period.

When the remaining time period of the time slot is less than the invalid time period, the processor further executes the sorting method to execute a worst case to decode at least one remaining data package of the general data packages that are undecoded according to the second sorting list.

Since the processor of the communication apparatus further executes the worst case to decode the communication data packages that are undecoded according to the second sorting list when the decoding time period for decoding the communication data packages that are undecoded is greater than the remaining time period of the time slot, the remaining time period of the time slot can be effectively utilized to improve an efficiency of the communication apparatus.

DETAILED DESCRIPTION OF THE INVENTION

In the following, the technical solutions in the embodiments of the present invention will be clearly and fully described with reference to the drawings in the embodiments of the present invention. Obviously, the described embodiments are only a part of, not all of, the embodiments of the present invention. Based on the embodiments of the present invention, all other embodiments obtained by a person of ordinary skill in the art without creative efforts shall fall within the protection scope of the present invention.

Figure 1:
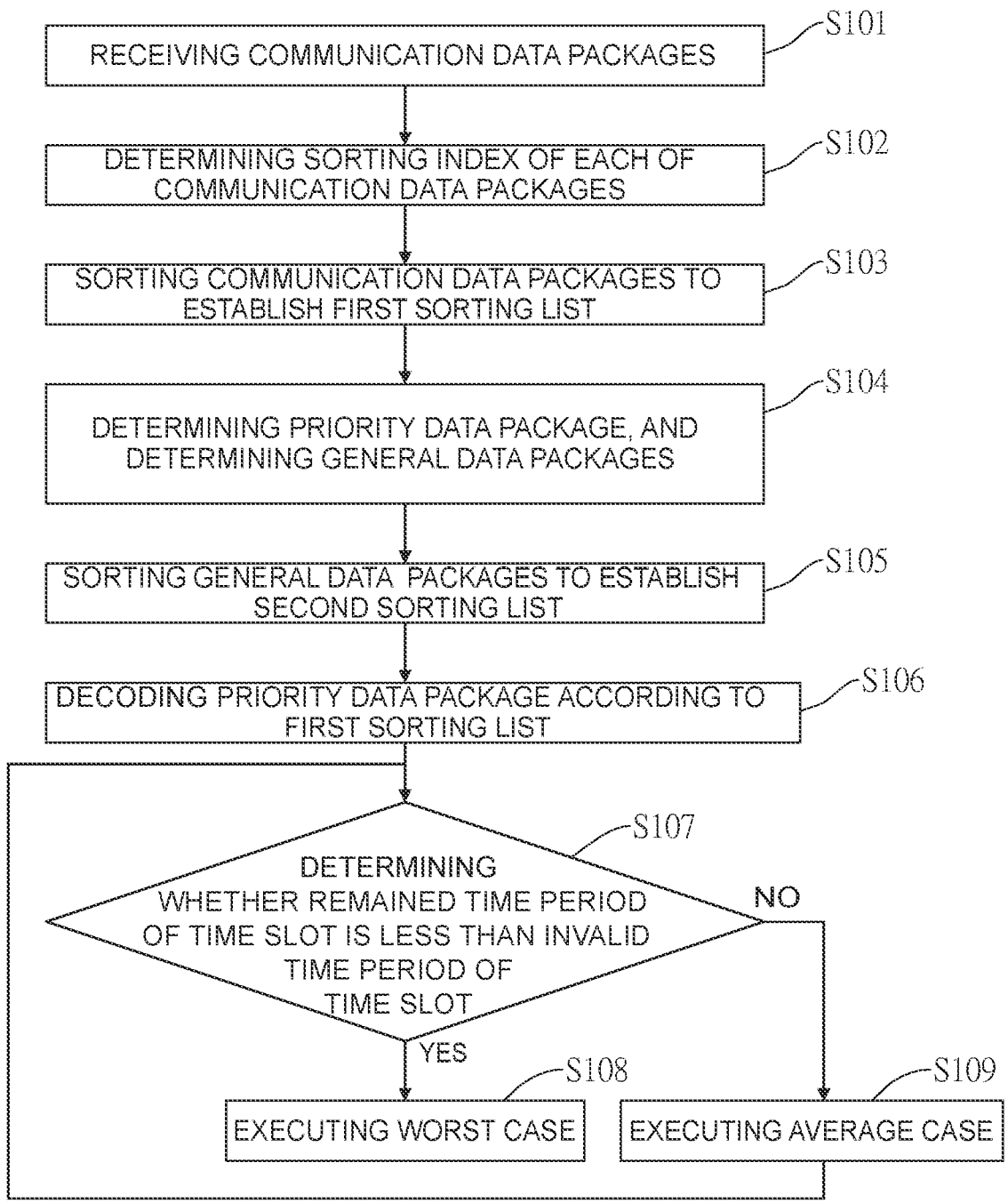
FIG. 1 is a flowchart of a sorting method of communication data of the present invention.

FIG. 1 is a flowchart of a sorting method of communication data, which is executed by a communication apparatus for sorting the communication data.

Figure 2:
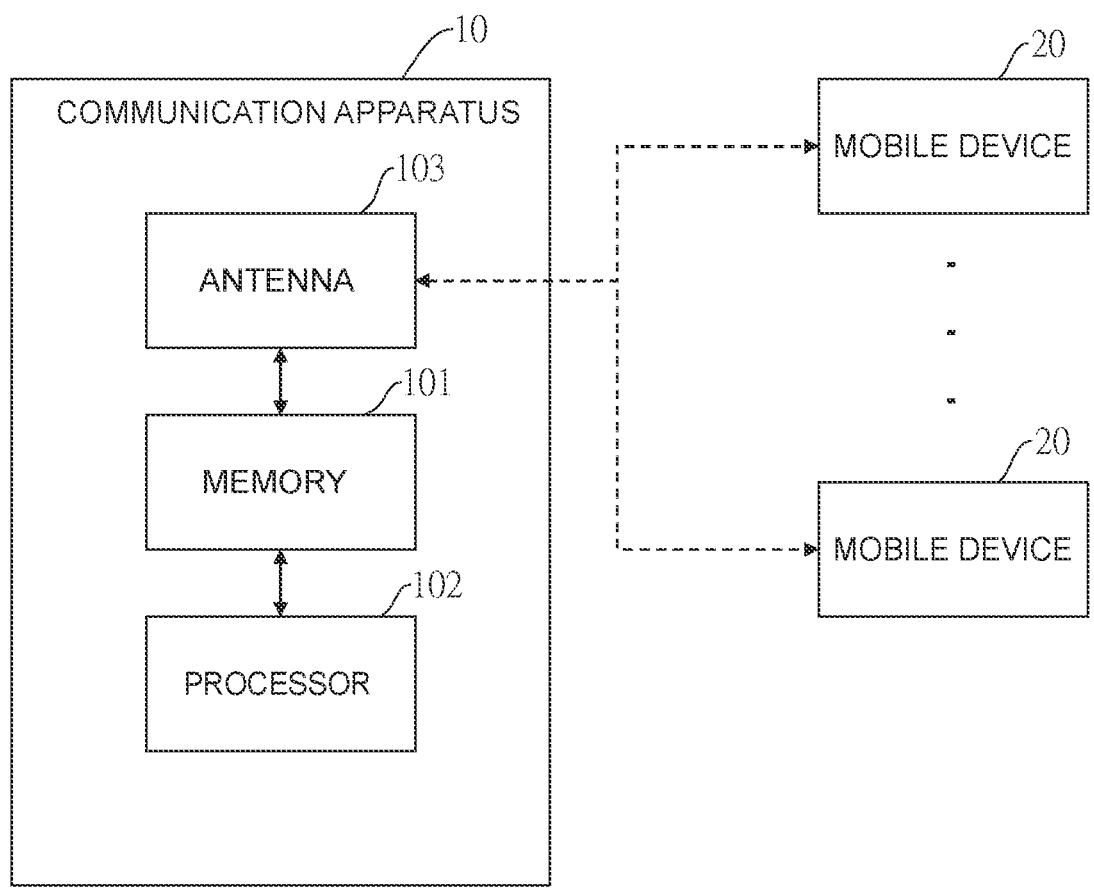
FIG. 2 is a block diagram of a communication apparatus for sorting communication data of the present invention.

Further with reference to FIG. 2, the communication apparatus 10 includes a memory 101, a processor 102, and an antenna 103. The processor 102 is electrically connected to the memory 101, and the memory 101 is electrically connected to the antenna 13. The antenna 103 is used to wirelessly communicate with a plurality of mobile devices 20.

Figure 3:
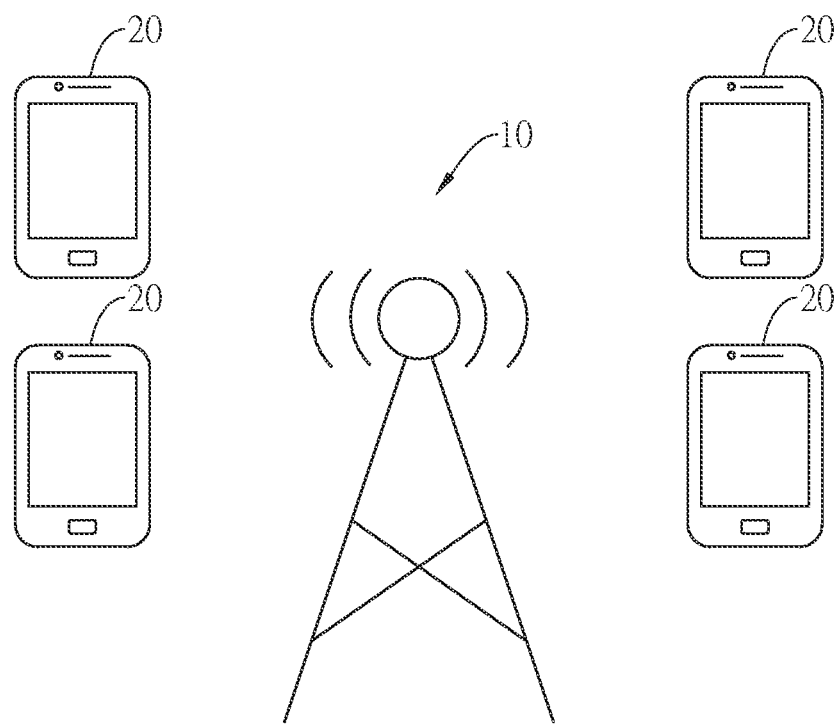
FIG. 3 is a schematic diagram of the communication apparatus of the present invention.

With reference to FIG. 3, in an embodiment, the communication apparatus 10 may be a cell site for communicating with the mobile devices 20. The memory 101 may be buffer of the communication apparatus 10 for buffering data packages from the mobile devices 20, and the processor 102 may be a decoder mounted in the cell cite for decoding the data packages in the memory 101. The antenna 103 wirelessly communicates with the mobile devices 20 through the third generation (3G) of wireless mobile telecommunications technology, the fourth generation (4G) of wireless mobile telecommunications technology, the fifth generation (5G) of wireless mobile telecommunications technology, or the sixth generation (6G) of wireless mobile telecommunications technology.

The memory 101 stores a plurality of communication data packages. The processor 102 executes the sorting method, and the sorting method includes the following steps.

In step S101, the processor 102 receives a plurality of communication data packages. In the embodiment, the antenna 103 receives the communication data packages from the mobile devices 20, and the memory 101 receives the communication data packages from the antenna 103, and stores the communication data packages.

In step S102, the processor 102 determines a sorting index of each of the communication data packages. Each of the sorting indexes is determined according to a data volume and channel quality of each of the communication data packages. In the embodiment, the sorting index is determined by multiplying the data volume with the channel quality. For example, the communication apparatus 10 communicates with ten mobile devices 20, and each of the mobile devices 20 represents a user. The mobile devices 20 communicate with the communication apparatus 10 through different channels, and the data volume of the communication data packages transmitted by the mobile devices 20 are different, which are listed in List 1 shown below.

List 1

| Channel Number (user) | Channel Quality | Data Volume | Sorting Index |
|---|---|---|---|
| 1 | 15 | 2k | 30 |
| 2 | 13 | 5k | 65 |
| 3 | 7 | 4k | 28 |
| 4 | 5 | 8k | 40 |
| 5 | 3 | 1k | 3 |
| 6 | 2 | 6k | 12 |
| 7 | 8 | 10k | 80 |
| 8 | 6 | 13k | 78 |
| 9 | 9 | 3k | 27 |
| 0 | 1 | 7k | 7 |

In step S103, the processor 102 sorts the communication data packages according to the sorting indexes by a first sorting procedure to establish a first sorting list. In the embodiment, the first sorting procedure sorts the communication data packages from the communication data package having the greatest sorting index to the communication data package having the lightest sorting index. For example, the first sorting list is listed in List 2 shown below.

List 2

| Decoding Sequence | Channel Number (user) | Channel Quality | Data Volume | Sorting Index |
|---|---|---|---|---|
| 1 | 7 | 8 | 10k | 80 |
| 2 | 8 | 6 | 13k | 78 |
| 3 | 2 | 13 | 5k | 65 |
| 4 | 4 | 5 | 8k | 40 |
| 5 | 1 | 15 | 2k | 30 |
| 6 | 3 | 7 | 4k | 28 |
| 7 | 9 | 9 | 3k | 27 |
| 8 | 6 | 2 | 6k | 12 |
| 9 | 0 | 1 | 7k | 7 |
| 10 | 5 | 3 | 1k | 3 |

Figure 4:
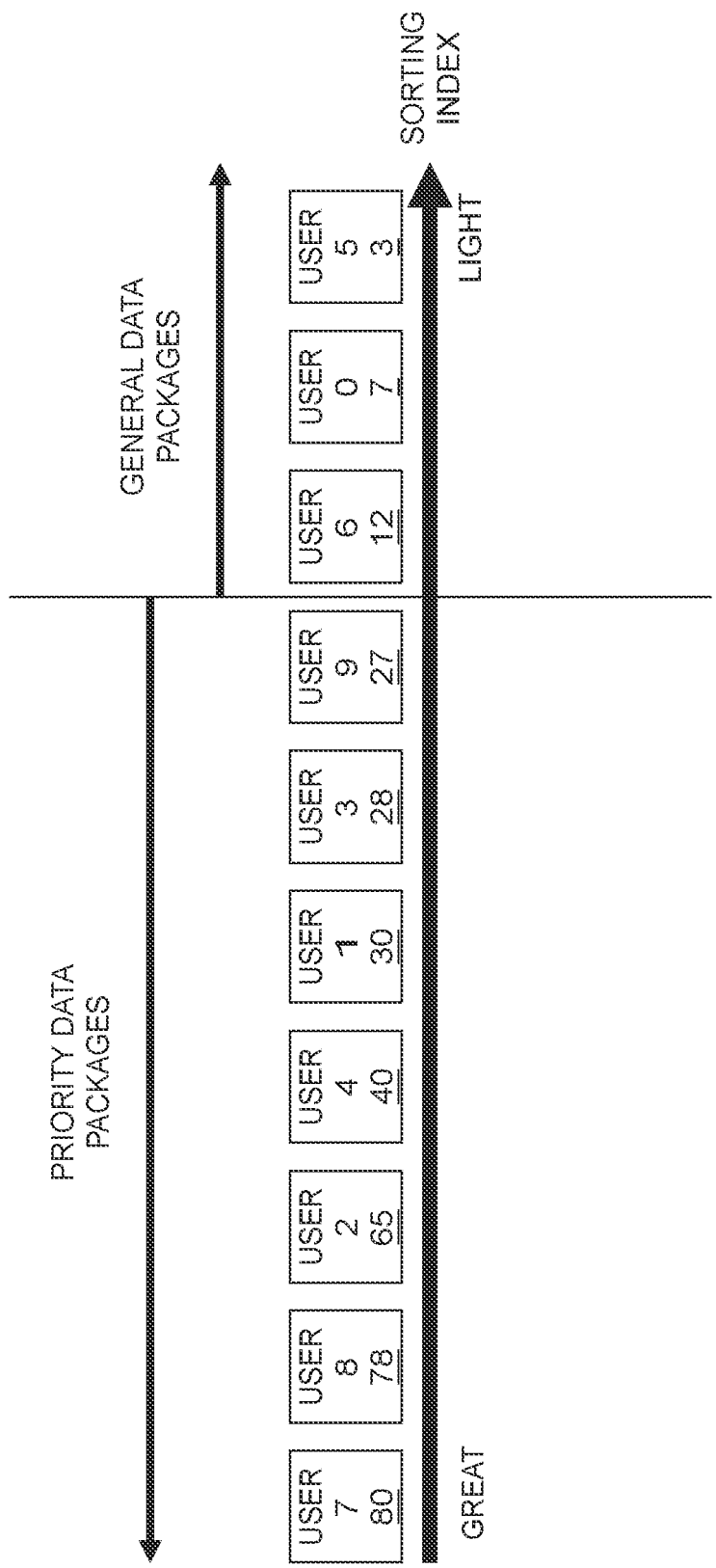
FIG. 4 is a schematic diagram of sorting communication data packages according to sorting indexes by a first sorting procedure.

With reference to FIG. 4, in step S104, the processor 102 determines at least one priority data package, and determines a plurality of general data packages. The general data packages are the communication data packages without the at least one priority data package. In the embodiment, the valid time period is 70% of the time slot. For example, if the time slot is 10 milliseconds (ms), the valid time period is 7 ms.

In an embodiment, the at least one priority data package is one data package which has a first sorting sequence according to the first sorting list. For example, the at least one priority data package is the data package that has the decoding sequence of 1.

In another embodiment, the at least one priority data package includes a plurality of data packages which can be decoded during a valid time period of the time slot according to the first sorting list from the communication data packages.

For example, if the processor 102 may determine that the top seven communication data packages according to the decoding sequence of the first sorting list can be decoded within 7 ms, the top seven communication data packages according to the decoding sequence of the first sorting list are determined to be priority data packages. Further, the last three communication data packages according to the decoding sequence of the first sorting list are determined to be the general data packages.

Figure 5:
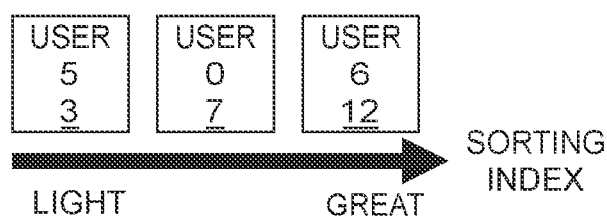
FIG. 5 is a schematic diagram of sorting general data packages according to the sorting indexes by a second sorting procedure to establish a second sorting list.

With reference to FIG. 5, in step S105, the processor 102 sorts the general data packages according to the sorting indexes by a second sorting procedure to establish a second sorting list. In the embodiment, the second sorting procedure sorts the general data packages from the general data package having the lightest sorting index to the general data package having the greatest sorting index. For example, the first sorting list is listed in List 3 as shown below.

List 3

| Decoding Sequence | Channel Number (user) | Channel Quality | Data volume | Sorting Index |
|---|---|---|---|---|
| 1 | 5 | 3 | 1k | 3 |
| 2 | 0 | 1 | 7k | 7 |
| 3 | 6 | 2 | 6k | 12 |

In step S106, the processor 102 decodes the at least one priority data package according to the first sorting list.

In step S107, the processor 102 determines whether a remaining time period of the time slot is less than an invalid time period of the time slot. The remaining time period is a time period of the time slot before the time slot times out. The invalid time period is an entire time period of the time slot without the valid time period.

In step S108, when the remaining time period of the time slot is less than the invalid time period, the processor 102 executes a worst case to decode at least one remaining data package of the general data packages that are undecoded according to the second sorting list.

When the remaining time period of the time slot is less than the invalid time period, the remaining time period is not enough for decoding all of the communication data packages that are undecoded, and the processor 102 executes the worst case.

In the worst case, the processor 102 firstly decodes the communication data package having the lightest sorting index. Since the sorting index is corresponding to the channel quality and the data volume, the communication data package having the lightest sorting index is the communication data package with the least amount of the decoding time period.

In the embodiment, the remaining time period is a time period remaining after decoding the last decoded communication data package within the time slot. For example, the time slot is 10 ms. After the communication data package having the 5th decoding sequence according to the first sorting list is decoded, the processor 102 spends 7 ms, and the remaining time period is 3 ms. After the communication data package having the 7th decoding sequence according to the first sorting list is decoded, the processor 102 spends 8 ms, and the remaining time period is 2 ms.

Namely, even if the remaining time period is not enough for decoding all of the communication data packages that are undecoded, the processor 102 can still decode the communication data package having the lightest sorting index.

Therefore, the processor 102 can decode the communication data packages as much as possible within the time slot, and the remaining time period of the time slot can be effectively utilized to improve an efficiency of the communication apparatus 10.

In step S109, when the remaining time period of the time slot is greater than the invalid time period, the processor 102 executes an average case to decode the one remaining data package of the general data packages having a sorting sequence next to the last decoded communication data package according to the first sorting list, and the processor 102 returns to execute step S107 to determine whether the remaining time period of the time slot is less than the invalid time period of the time slot.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A sorting method of communication data, executed by a processor of a communication apparatus, and comprising steps of:
   receiving a plurality of communication data packages;
   determining a sorting index of each of the communication data packages;
   sorting the communication data packages according to the sorting indexes by a first sorting procedure to establish a first sorting list;
   determining at least one priority data package, and determining a plurality of general data packages;
   sorting the general data packages according to the sorting indexes by a second sorting procedure to establish a second sorting list;
   decoding the at least one priority data package according to the first sorting list;
   determining whether a remaining time period of a time slot is less than an invalid time period of the time slot; wherein the remaining time period is a time period of the time slot before the time slot times out; wherein the invalid time period is an entire time period of the time slot without a valid time period;
   when the remaining time period of the time slot is less than the invalid time period, executing a worst case to decode at least one remaining data package of the general data packages that are undecoded according to the second sorting list.

2. The sorting method as claimed in claim 1, wherein the at least one priority data package is one data package which has a first sorting sequence according to the first sorting list.

3. The sorting method as claimed in claim 1, wherein the at least one priority data package is a plurality of data packages which are decodable during the valid time period of the time slot according to the first sorting list from the communication data packages.

4. The sorting method as claimed in claim 1, wherein the general data packages are the communication data packages without the at least one priority data package.

5. The sorting method as claimed in claim 1, further comprising steps of:
   when the remaining time period of the time slot is greater than the invalid time period, executing an average case to decode the one remaining data package of the general data packages having a sorting sequence next to the last decoded communication data package according to the first sorting list;
   returning to the step of determining whether the remaining time period of the time slot is less than the invalid time period of the time slot.

6. The sorting method as claimed in claim 1, wherein each of the sorting indexes is determined according to a data volume and channel quality of each of the communication data packages.

7. The sorting method as claimed in claim 1, wherein the first sorting procedure sorts the communication data packages from the communication data package having the greatest sorting index to the communication data package having the lightest sorting index.

8. The sorting method as claimed in claim 1, wherein the second sorting procedure sorts the general data packages from the general data package having the lightest sorting index to the general data package having the greatest sorting index.

9. The sorting method as claimed in claim 1, wherein the valid time period is 70% of the time slot.

10. A communication apparatus for sorting communication data, comprising:
   a memory, storing a plurality of communication data packages;
   a processor, electrically connected to the memory, and receiving the communication data packages;
   wherein the processor determines a sorting index of each of the communication data packages, sorts the communication data packages according to the sorting indexes by a first sorting procedure to establish a first sorting list, determines at least one priority data package, and determines a plurality of general data packages;
   wherein the processor further sorts the general data packages according to the sorting indexes by a second sorting procedure to establish a second sorting list, decodes the at least one priority data package according to the first sorting list, and determines whether a remaining time period of a time slot is less than an invalid time period of the time slot; wherein the remaining time period is a time period of the time slot before the time slot times out; wherein the invalid time period is an entire time period of the time slot without a valid time period;
   wherein when the remaining time period of the time slot is less than the invalid time period, the processor executes a worst case to decode at least one remaining data package of the general data packages that are undecoded according to the second sorting list.

11. The communication apparatus as claimed in claim 10, wherein the at least one priority data package is one data package which has a first sorting sequence according to the first sorting list.

12. The communication apparatus as claimed in claim 10, wherein the at least one priority data package is a plurality of data packages which are decodable during the valid time period of the time slot according to the first sorting list from the communication data packages.

13. The communication apparatus as claimed in claim 10, wherein the general data packages are the communication data packages without the at least one priority data package.

14. The communication apparatus as claimed in claim 10, wherein when the remaining time period of the time slot is greater than the invalid time period, the processor executes an average case to decode the one remaining data package of the general data packages having a sorting sequence next to the last decoded communication data package according to the first sorting list, and the processor returns to determine whether the remaining time period of the time slot is less than the invalid time period of the time slot.

15. The communication apparatus as claimed in claim 10, wherein each of the sorting indexes is determined according to a data volume and channel quality of each of the communication data packages.

16. The communication apparatus as claimed in claim 10, wherein the first sorting procedure sorts the communication data packages from the communication data package having the greatest sorting index to the communication data package having the lightest sorting index.

17. The communication apparatus as claimed in claim 10, wherein the second sorting procedure sorts the general data packages from the general data package having the lightest sorting index to the general data package having the greatest sorting index.

18. The communication apparatus as claimed in claim 10, wherein the valid time period is 70% of the time slot.

19. The communication apparatus as claimed in claim 10, further comprising:
    an antenna, electrically connected to the memory, and wirelessly communicating with a plurality of mobile devices for receiving the communication data packages from the mobile devices;
    wherein the memory receives and stores the communication data packages from the antenna.

20. The communication apparatus as claimed in claim 19, wherein the antenna wirelessly communicates with the mobile devices through third generation of wireless mobile telecommunications technology, fourth generation of wireless mobile telecommunications technology, fifth generation of wireless mobile telecommunications technology, or sixth generation of wireless mobile telecommunications technology;
    wherein the processor is a decoder mounted in a cell site of the mobile devices.

\* \* \* \* \*